US008539125B1

(12) United States Patent
Ford et al.

(10) Patent No.: US 8,539,125 B1
(45) Date of Patent: Sep. 17, 2013

(54) COMBINED USB FLASH DRIVE CAP AUDIO DEVICE

(76) Inventors: Michael Ford, Ashland, VA (US); Sarah Ford, Ashland, VA (US)

(*) Notice: Subject to any disclaimer, the term of this patent is extended or adjusted under 35 U.S.C. 154(b) by 116 days.

(21) Appl. No.: 13/366,303

(22) Filed: Feb. 4, 2012

Related U.S. Application Data

(60) Provisional application No. 61/444,604, filed on Feb. 18, 2011.

(51) Int. Cl.
*G06F 13/00* (2006.01)
*G06F 3/00* (2006.01)

(52) U.S. Cl.
USPC ............ 710/74; 710/2; 710/5; 710/8; 710/15; 710/62

(58) Field of Classification Search
None
See application file for complete search history.

(56) References Cited

U.S. PATENT DOCUMENTS

| | | | | |
|---|---|---|---|---|
| 6,438,638 | B1 | 8/2002 | Jones et al. | |
| 6,733,329 | B2 | 5/2004 | Yang | |
| 6,832,281 | B2 | 12/2004 | Jones et al. | |
| 6,874,044 | B1 | 3/2005 | Chou et al. | |
| 6,993,618 | B2 | 1/2006 | Chen et al. | |
| 7,070,425 | B2 | 7/2006 | Regen et al. | |
| 7,103,684 | B2 | 9/2006 | Chen et al. | |
| 7,222,205 | B2 | 5/2007 | Jones et al. | |
| 7,278,051 | B2 | 10/2007 | Mambakkam et al. | |
| D562,819 | S | 2/2008 | Yu et al. | |
| 7,329,153 | B2 | 2/2008 | Lin et al. | |
| D569,375 | S | 5/2008 | Yu et al. | |
| 7,400,859 | B2 | 7/2008 | Dayan | |
| 7,814,337 | B2 | 10/2010 | Lee et al. | |
| 2004/0165302 | A1 | 8/2004 | Lu | |
| 2005/0079738 | A1 | 4/2005 | Ahn | |
| 2005/0288804 | A1 | 12/2005 | Peng | |
| 2006/0064185 | A1 | 3/2006 | Yeh | |
| 2006/0069456 | A1 | 3/2006 | Stringer et al. | |
| 2006/0172599 | A1* | 8/2006 | Hankey et al. | 439/607 |
| 2006/0217150 | A1 | 9/2006 | Chen | |
| 2006/0288169 | A1 | 12/2006 | Steiner | |
| 2007/0084929 | A1 | 4/2007 | Watanabe et al. | |
| 2008/0133832 | A1 | 6/2008 | Bhavnani | |
| 2008/0189486 | A1* | 8/2008 | Nguyen et al. | 711/115 |
| 2009/0020443 | A1 | 1/2009 | Kesselman | |
| 2009/0191920 | A1 | 7/2009 | Regen et al. | |
| 2009/0198355 | A1 | 8/2009 | Powell | |
| 2010/0167574 | A1* | 7/2010 | Hankey et al. | 439/350 |

OTHER PUBLICATIONS

Royal EZVue Vista USB Drive, found online, http://www.letsgodigital.org/en/news/articles/story_5729.html.

(Continued)

*Primary Examiner* — Scott Sun
(74) *Attorney, Agent, or Firm* — Crose Law LLC; Bradley D. Crose

(57) ABSTRACT

A combined USB flash drive cap audio device is provided. In at least one embodiment, a thumb drive cap includes: a portable housing defined as a USB cap for a portable USB storage thumb drive; a female USB connector interface defined within the portable housing and configured to receive and electronically couple to a male USB connector on the portable USB storage thumb drive; a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record.

61 Claims, 4 Drawing Sheets

(56) References Cited

OTHER PUBLICATIONS

KJB, D1400 USB Flash Drive & Voice Recorder 2GB, found online, http://www.surveillance-video.com/d1400.html?productid=d1400@channelid=FROOG.

Retractable Biometric USB Flash Drive with USB Screen, found online, http://www.mydigitallife.info/retractable-biometric-usb-flashdrive-with-oled-screen/.

* cited by examiner

COMBINED USB FLASH DRIVE CAP AUDIO DEVICE

CROSS-REFERENCE TO RELATED APPLICATION(S)

The present non-provisional patent application claims the benefit of priority of U.S. Provisional Patent Application No. 61/444,604, which is entitled "A BATTERY POWERED USB/THUMB DRIVE CAP THAT CONVERTS A USB/THUMB DRIVE INTO A MEDIA PLAYER AND RECORDING DEVICE", which was filed on Feb. 18, 2011, and which is incorporated in full by reference herein.

FIELD OF THE INVENTION

The technology described herein relates generally to media devices, USB devices, audio players, audio recorders, data storage devices, and the like. More specifically, this technology relates to a combined USB flash drive cap audio device, wherein a battery powered USB/thumb drive cap converts a USB/thumb drive into a media player and recording device.

BACKGROUND OF THE INVENTION

Portable flash memory drives have become so popular they now seem nearly ubiquitous. Portable flash memory drives are data storage devices used, for example, to save electronic digital data such as music, files, texts, multimedia files, graphics, and so forth. Portable flash memory drives are both compact and portable, often carried in purses, pockets, on key chains, and on lanyards around one's neck. Typically, portable flash memory drives have large storage capacities and offer stability and durability against data corruption and physical damage. A preferred standard in portable flash memory drives is the USB (Universal Serial Bus). USB flash drives are useful to transfer electronic data.

Related utility patents known in the art include the following:

U.S. Pat. No. 6,438,638, issued to Jones et al. on Aug. 20, 2002, discloses a flashtoaster for reading several types of flash-memory cards with or without a PC.

U.S. Pat. No. 6,733,329, issued to Yang on May 11, 2004, discloses a USB flash drive.

U.S. Pat. No. 6,832,281, issued to Jones et al. on Dec. 14, 2004, discloses a flashtoaster for reading several types of flash-memory cards with or without a PC.

U.S. Pat. No. 6,874,044, issued to Chou et al. on Mar. 29, 2005, discloses a flash drive/reader with serial-port controller and flash-memory controller mastering a second RAM-buffer bus parallel to a CPU bus.

U.S. Pat. No. 6,993,618, issued to Chen et al. on Jan. 31, 2006, discloses a dual-mode flash storage exchanger that transfers flash-card data to a removable USB flash key-drive with or without a PC host.

U.S. Pat. No. 7,103,684, issued to Chen et al. on Sep. 5, 2006, discloses a single-chip USB controller reading power-on boot code from integrated flash memory for user storage.

U.S. Pat. No. 7,222,205, issued to Jones et al. on May 22, 2007, discloses a flashtoaster for reading several types of flash-memory cards with or without a PC.

U.S. Pat. No. 7,278,051, issued to Mambakkam et al. on Oct. 2, 2007, discloses a field-operable, stand-alone apparatus for media recovery and regeneration.

U.S. Pat. No. 7,814,337, issued to Lee et al. on Oct. 12, 2010, discloses a secure flash-memory card reader with host-encrypted data on a flash-controller-mastered bus parallel to a local CPU bus carrying encrypted hashed password and user ID.

U.S. Pat. No. 7,329,153, issued to Lin et al. on Feb. 12, 2008, discloses an audio output device.

U.S. Pat. No. 7,400,859, issued to Dayan on Jul. 15, 2008, discloses a combined modulator and MP3 player having socket power supply adapter and/or universal connector.

U.S. Pat. No. 7,070,425, issued to Regen et al. on Jul. 4, 2006, discloses a thumb drive with retractable USB connector.

Related design patents known in the art include the following:

U.S. Patent No. D562,819, issued to Yu et al. on Feb. 26, 2008, discloses the ornamental design for a memory card reader.

U.S. Patent No. D569,375, issued to Yu et al. on Feb. 26, 2008, discloses the ornamental design for a memory card reader.

Related patent application publications known in the art include the following:

U.S. Patent Application Publication No. 2009/0191920, filed by Regen et al. and published on Jul. 30, 2009, discloses a multi-function electronic ear piece.

U.S. Patent Application Publication No. 2009/0198355, filed by Powell and published on Aug. 6, 2009, discloses an ear-mounted MP3 player with radio and remote control.

U.S. Patent Application Publication No. 2009/0020443, filed by Kesselman and published on Jan. 22, 2009, discloses a credit card carrying pack for rolling papers having a USB drive.

U.S. Patent Application Publication No. 2008/0133832, filed by Bhavnani and published on Jun. 5, 2008, discloses a flash drive-radio combination.

U.S. Patent Application Publication No. 2006/0288169, filed by Steiner and published on Dec. 21, 2006, discloses a lighter apparatus with data storage capabilities and a data transfer interface.

U.S. Patent Application Publication No. 2006/0217150, filed by Chen and published on Sep. 28, 2006, discloses a multi-function remote controller.

U.S. Patent Application Publication No. 2007/0084929, filed by Watanabe et al. and published on Apr. 19, 2007, discloses a bar code reader with a music player.

U.S. Patent Application Publication No. 2006/0069456, filed by Stringer et al. and published on Mar. 30, 2006, discloses a portable audio player.

U.S. Patent Application Publication No. 2006/0064185, filed by Yeh and published on Mar. 23, 2006, discloses a structure of removable storage media player.

U.S. Patent Application Publication No. 2005/0079738, filed by Ahn and published on Apr. 14, 2005, discloses a USB storage device including USB plug with top and bottom terminals.

U.S. Patent Application Publication No. 2005/0288804, filed by Peng and published on Dec. 29, 2005, discloses a USB music player capable of receiving at least one portable memory.

U.S. Patent Application Publication No. 2004/0165302, filed by Lu and published on Aug. 26, 2004, discloses a structure of a multi-purpose thumb-like hard disk device.

Related non-patent literature known in the art includes the following:

Royal EZVue Vista USB Drive, found online, http://www.letsgodigital.org/en/news/articles/story_5729.html.

KJB, D1400 USB Flash Drive & Voice Recorder 2 GB, found online, http://www.surveillance-video.com/d1400.html?productid=d1400@channelid=FROOG.

Retractable Biometric USB Flash Drive with USB Screen, found online, http://www.mydigitallife.infoketractable-biometric-usb-flashdrive-with-oled-screen/.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a combined USB flash drive cap audio device, wherein a battery powered USB/thumb drive cap converts a USB/thumb drive into a media player and recording device.

In one exemplary embodiment, the technology described herein provides a thumb drive cap. The thumb drive cap includes: a portable housing defined as a USB cap for a portable USB storage thumb drive; a female USB connector interface defined within the portable housing and configured to receive and electronically couple to a male USB connector on the portable USB storage thumb drive; a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record.

In at least one embodiment of the thumb drive cap, the control unit is further configured to enable audio record input through the thumb drive cap and stored on the portable USB storage thumb drive.

In at least one embodiment of the thumb drive cap, the thumb drive cap is further configured not to store audio files in the thumb drive cap but to access audio files stored on the portable USB storage thumb drive for playback through the thumb drive cap.

The thumb drive cap, in at least one embodiment, also includes a microprocessor.

The thumb drive cap, in at least one embodiment, further includes an audio amplifier.

The thumb drive cap, in at least one embodiment, also includes a signal amplifier.

The thumb drive cap, in at least one embodiment, further includes a digital signal processor.

The thumb drive cap, in at least one embodiment, also includes a memory.

The thumb drive cap, in at least one embodiment, further includes firmware logic.

The thumb drive cap, in at least one embodiment, also includes a microphone disposed within the portable housing.

The thumb drive cap, in at least one embodiment, further includes a microphone disposed within the portable housing and configured to activate the thumb drive cap by voice actuation.

The thumb drive cap, in at least one embodiment, also includes a microphone disposed within the portable housing and configured to receive input audio signals to be processed by the control unit.

The thumb drive cap, in at least one embodiment, further includes a microphone disposed within the portable housing and configured to receive input audio signals to be processed by the control unit and stored on the attached portable USB storage thumb drive.

The thumb drive cap, in at least one embodiment, also includes a power source disposed within the portable housing.

The thumb drive cap, in at least one embodiment, further includes an audio output port.

The thumb drive cap, in at least one embodiment, also includes a speaker.

The thumb drive cap, in at least one embodiment, further includes: a power button; and an LED indicator light defined within the power button and configured to illuminate when the drive cap is in an ON state and to not illuminate when the drive cap is in an OFF state.

The thumb drive cap, in at least one embodiment, also includes a Bluetooth interface.

The thumb drive cap, in at least one embodiment, further includes a visual display.

The thumb drive cap, in at least one embodiment, also includes a scroll mechanism.

The thumb drive cap, in at least one embodiment, further includes: a VOLUME control; a PLAY button; a RECORD button; a NEXT TRACK button; and a PREVIOUS track button.

In another exemplary embodiment, the technology described herein provides a portable media player/recorder system. The portable media player/recorder system includes: at least one portable USB storage thumb drive; a portable housing defined as a USB thumb drive cap for the portable USB storage thumb drive; a female USB connector interface defined within the portable housing and configured to receive as a cap and electronically couple to a male USB connector on the portable USB storage thumb drive; a control unit disposed within the portable housing and configured to enable audio playback through the thumb drive cap of audio data stored on the connected portable USB storage thumb drive; a plurality of user interface buttons disposed upon the portable housing and through which the thumb drive cap is controlled by a user for audio playback and audio record; and an audio output port.

In at least one embodiment of the portable media player/recorder system, the control unit is further configured to enable audio record input through the thumb drive cap and stored on the portable USB storage thumb drive.

In at least one embodiment of the portable media player/recorder system, the thumb drive cap is further configured not to store audio files in the thumb drive cap but to access audio files stored on the portable USB storage thumb drive for playback through the thumb drive cap.

The portable media player/recorder system, in at least one embodiment, also includes a microprocessor.

The portable media player/recorder system, in at least one embodiment, further includes an audio amplifier.

The portable media player/recorder system, in at least one embodiment, also includes a signal amplifier.

The portable media player/recorder system, in at least one embodiment, further includes a digital signal processor.

The portable media player/recorder system, in at least one embodiment, also includes a memory.

The portable media player/recorder system, in at least one embodiment, further includes firmware logic.

The portable media player/recorder system, in at least one embodiment, also includes a microphone disposed within the portable housing.

The portable media player/recorder system, in at least one embodiment, further includes a microphone disposed within the portable housing and configured to activate the thumb drive cap by voice actuation.

The portable media player/recorder system, in at least one embodiment, also includes a microphone disposed within the portable housing and configured to receive input audio signals to be processed by the control unit.

The portable media player/recorder system, in at least one embodiment, further includes a microphone disposed within the portable housing and configured to receive input audio signals to be processed by the control unit and stored on the attached portable USB storage thumb drive.

The portable media player/recorder system, in at least one embodiment, also includes: a power source; a power button; and an LED indicator light defined within the power button and configured to illuminate when the drive cap is in an ON state and to not illuminate when the drive cap is in an OFF state.

The portable media player/recorder system, in at least one embodiment, further includes a speaker.

The portable media player/recorder system, in at least one embodiment, also includes a Bluetooth interface.

The portable media player/recorder system, in at least one embodiment, further includes a visual display.

The portable media player/recorder system, in at least one embodiment, also includes a scroll mechanism.

The portable media player/recorder system, in at least one embodiment, further includes: a VOLUME control; a PLAY button; a RECORD button; a NEXT TRACK button; and a PREVIOUS track button.

In another exemplary embodiment, the technology described herein provides a method audio playback utilizing a thumb drive cap. The method includes: utilizing a thumb drive cap comprising: a portable housing defined as a USB cap for a portable USB storage thumb drive; a female USB connector interface defined within the portable housing and configured to receive and electronically couple to a male USB connector on the portable USB storage thumb drive; a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record; enabling audio playback through the thumb drive cap of audio data stored on the connected portable USB storage thumb drive; and retrieving audio data stored on the connected portable USB storage thumb drive.

It at least one embodiment, wherein the control unit is further configured to enable audio record input through the thumb drive cap and stored on the portable USB storage thumb drive, the method further includes: enabling audio record input through the thumb drive cap; and storing recorded data on the portable USB storage thumb drive.

It at least one embodiment, wherein the thumb drive cap is further configured not to store audio files in the thumb drive cap but to access audio files stored on the portable USB storage thumb drive for playback through the thumb drive cap, the method further includes: accessing audio files stored on the portable USB storage thumb drive; and playing the accessed audio files through the thumb drive cap.

It at least one embodiment, the method includes utilizing a control unit further having a microprocessor.

The method also includes, in at least one embodiment, amplifying an audio input.

The method further includes, in at least one embodiment, amplifying a signal.

It at least one embodiment, the method includes utilizing a control unit further having a digital signal processor.

It at least one embodiment, the method includes utilizing a control unit further having a memory.

It at least one embodiment, the method includes utilizing a control unit further having firmware logic.

It at least one embodiment, the method includes utilizing a thumb drive cap further having a microphone disposed within the portable housing.

It at least one embodiment, the method includes utilizing a thumb drive cap further having a microphone disposed within the portable housing and configured to activate the thumb drive cap by voice actuation, and including the method step of actuating by voice the thumb drive cap.

It at least one embodiment, the method includes utilizing a thumb drive cap further having a microphone disposed within the portable housing and configured to receive input audio signals to be processed by the control unit, and including the method step of receiving input audio signals.

It at least one embodiment, the method includes utilizing a thumb drive cap further having a microphone disposed within the portable housing and configured to receive input audio signals to be processed by the control unit and stored on the attached portable USB storage thumb drive, and including the method step receiving input audio signals.

It at least one embodiment, the method includes utilizing a thumb drive cap further having a power source disposed within the portable housing.

It at least one embodiment, the method includes utilizing a thumb drive cap further having an audio output port.

It at least one embodiment, the method includes utilizing a thumb drive cap further having a speaker.

It at least one embodiment, the method includes utilizing a thumb drive cap further having a power button; and an LED indicator light defined within the power button and configured to illuminate when the drive cap is in an ON state and to not illuminate when the drive cap is in an OFF state.

It at least one embodiment, the method includes utilizing a thumb drive cap further having a Bluetooth interface.

It at least one embodiment, the method includes utilizing a thumb drive cap further having a visual display.

It at least one embodiment, the method includes utilizing a thumb drive cap further having a scroll mechanism.

It at least one embodiment, the method includes utilizing a thumb drive cap further having a VOLUME control; a PLAY button; a RECORD button; a NEXT TRACK button; and a PREVIOUS track button.

Advantageously, the technology described herein provides a portable, small, pocket friendly sized device that will directly interface with any removable USB storage device portably and powered by batteries. This will allow a user to directly access audible media on any USB storage device and to also record audible media directly to the USB storage device while on the go.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a combined USB flash drive cap audio device, wherein a battery powered USB/thumb drive cap converts a USB/thumb drive into a media player and recording device.

Referring now to the Figures, a thumb drive cap 10 is shown. The thumb drive cap 10 is a portable, small, pocket friendly sized device that will directly interface with any removable USB storage device 12 portably. This will allow a user to directly access audible media on any USB storage device 12 and to also record audible media directly to the USB storage device 12 while on the go. The thumb drive cap 10 also serves as a protective cap to the USB storage device 12.

Figure 1:
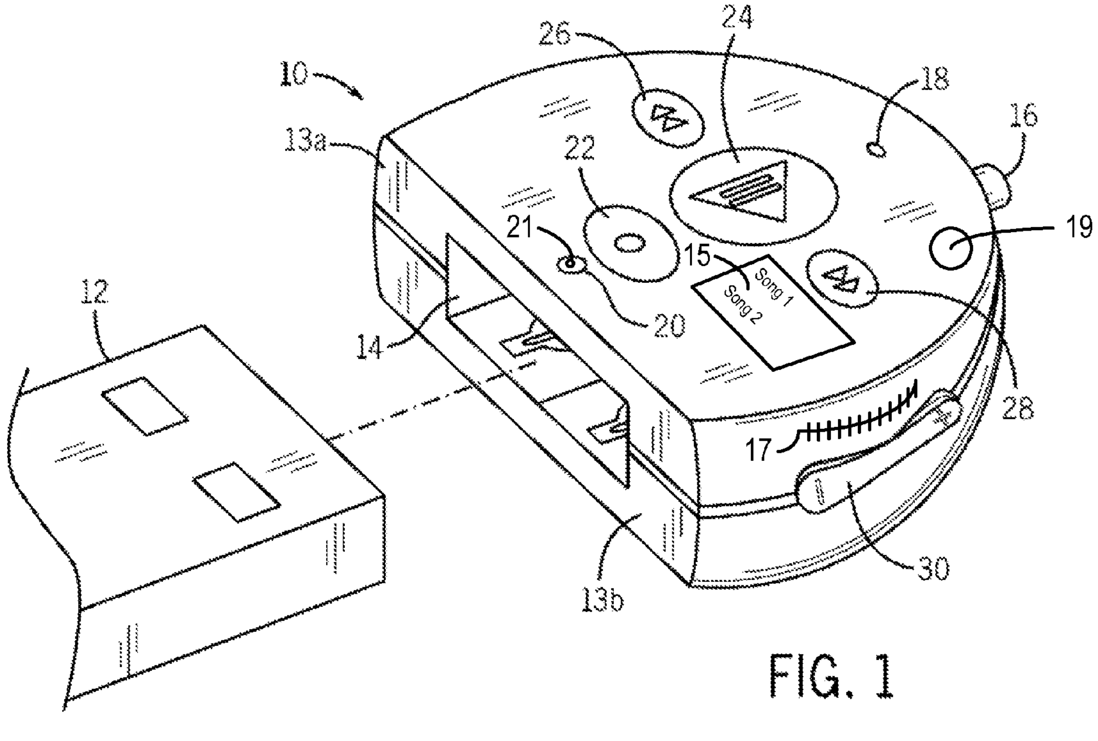
FIG. 1 is a front perspective view of a combined USB flash drive cap audio device, wherein a battery powered USB/thumb drive cap converts a USB/thumb drive into a media player and recording device, according to an embodiment of the technology described herein.

The thumb drive cap 10 includes a portable housing defined as a USB cap for a portable USB storage thumb drive 12. As depicted in FIG. 1, the portable housing includes a front panel 13*a* and a back panel 13*b*. In at least one embodiment, the front panel 13*a* and the back panel 13*b* are manufactured from a polymer for durability and functionality.

The thumb drive cap 10 includes a female USB connector interface 14 defined within the portable housing 13*a*, 13*b*. The female USB connector interface 14 is configured to receive and electronically couple to a male USB connector on the portable USB storage thumb drive 12.

The thumb drive cap 10 includes a control unit (FIG. 2) disposed within the portable housing. The control unit (FIG. 2) is configured to enable audio playback through the thumb drive cap 10 of audio data stored on the connected portable USB storage thumb drive 12. In at least one embodiment of the thumb drive cap 10, the control unit (FIG. 2) is further configured to enable audio record input through the thumb drive cap 10 and stored on the portable USB storage thumb drive 12. In at least one embodiment of the thumb drive cap 10, the control unit (FIG. 2) is further configured not to store audio files in the thumb drive cap 10 but to access audio files stored on the portable USB storage thumb drive 12 for playback through the thumb drive cap 10.

The thumb drive cap 10 includes multiple user interface buttons 22, 24, 26, 28, 30. The multiple user interface buttons 22, 24, 26, 28, 30 are disposed upon the portable housing 13*a* and electronically coupled to the button switch board 38. By use of the multiple user interface buttons 22, 24, 26, 28, 30, the thumb drive cap 10 is controlled selectively by a user for both audio playback and audio record.

The thumb drive cap 10, in at least one embodiment, also includes a printed circuit board 32 upon which components of the thumb drive cap 10 are coupled and interconnected for electronic communication. The button switch board 38 is coupled to the printed circuit board 32 via connecting ribbon 40 attached to input connector 36.

The thumb drive cap 10, in at least one embodiment, also includes one or more microprocessor 34 for control functions of the thumb drive cap 10. The microprocessor 34 is multipurpose and programmable. The microprocessor 34 is configured to accept digital data as input and to process it for the functional purposes of the thumb cap drive 10. The microprocessor 34 is configured to process the input data according to instructions stored in its memory 35 and provide results as output.

The thumb drive cap 10, in at least one embodiment, further includes an audio amplifier 31. The audio amplifier 31 is an electronic amplifier that amplifies a low-power audio signal to a level suitable for speakers, headphones, or the like.

The thumb drive cap 10, in at least one embodiment, also includes a signal amplifier 33. The signal amplifier 33 is configured to increase the power a signal in the thumb cap drive 10 by use of an energy source.

The thumb drive cap 10, in at least one embodiment, further includes a digital signal processor. In this embodiment, the microprocessor 34 is a specialized microprocessor 34 with an architecture optimized for the fast operational needs of digital signal processing.

The thumb drive cap 10, in at least one embodiment, also includes a memory 35. The memory 35 is an electronic data storage device, such as semiconductor memory. It stores data for use by the microprocessor 34. The memory 35 is used in at least one embodiment to store firmware logic.

Figure 2:
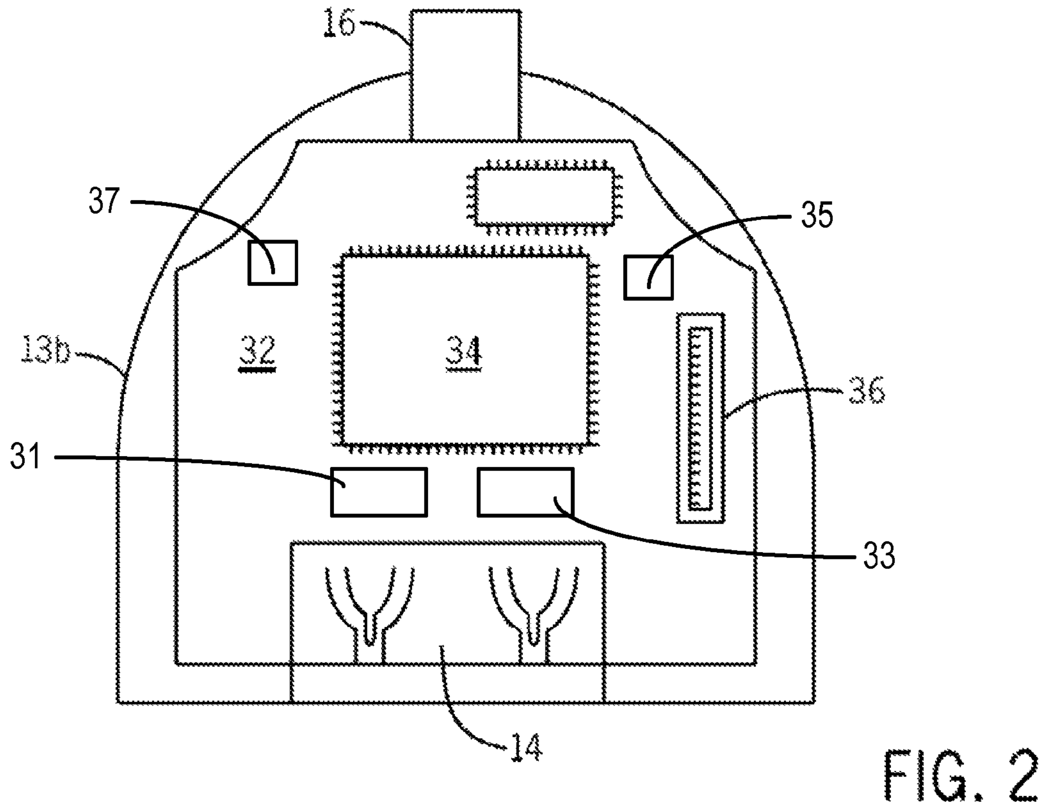
FIG. 2 is a planar view of the inside back panel of the combined USB flash drive cap audio device depicted in FIG. 1, according to an embodiment of the technology described herein.
Figure 3:
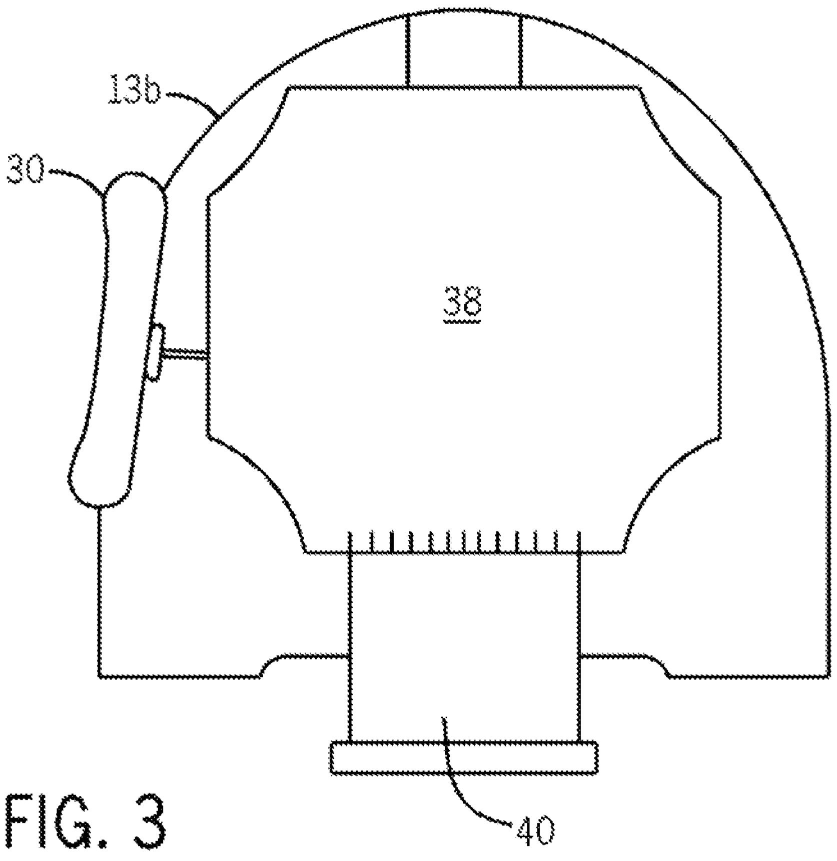
FIG. 3 is a planar view of the inside front panel of the combined USB flash drive cap audio device depicted in FIG. 1, according to an embodiment of the technology described herein.

The thumb drive cap 10, in at least one embodiment, also includes a microphone 18. The microphone 18 is disposed within the portable housing 13*a*. In at least one embodiment, the microphone 18 is configured to activate the thumb drive cap 10 by voice actuation. In at least one embodiment, the microphone 18 is configured to receive input audio signals to be processed by the control unit (FIG. 2). In at least one embodiment, the microphone 18 is configured to receive input audio signals to be processed by the control unit and stored on the attached portable USB storage thumb drive 12.

Figure 4:
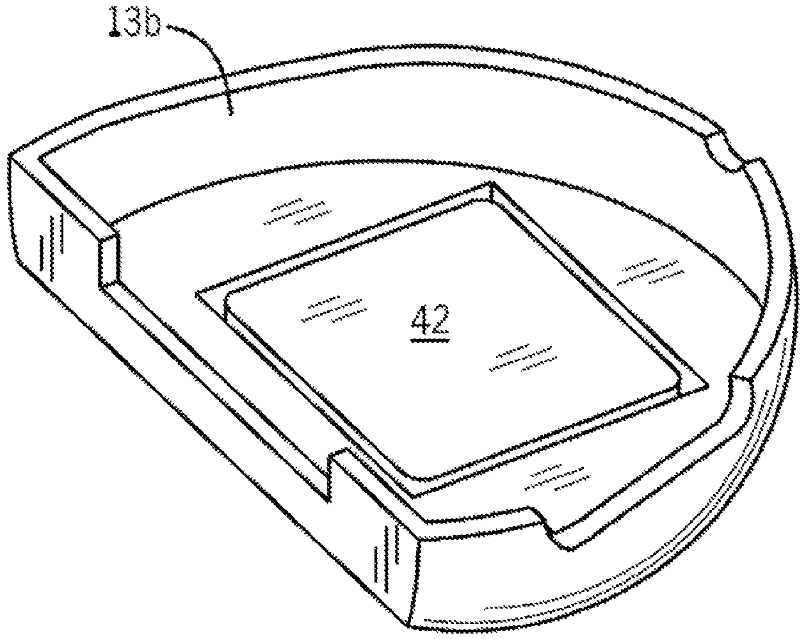
FIG. 4 is a perspective view of the inside of the back panel with the circuit board removed, according to an embodiment of the technology described herein.

The thumb drive cap 10, in at least one embodiment, also includes a power source disposed within the portable housing. As depicted in FIG. 4, the power source is a battery 42 in at least one embodiment. By way of example, the battery 42 is a lithium ion battery suitable for portable, compact electronic devices.

The thumb drive cap 10, in at least one embodiment, further includes an audio output port 16. The audio output port 16 is configured to receive headphones, a speaker, or the like.

The thumb drive cap 10, in at least one embodiment, also includes a speaker 19. The speaker 19 provides audio output from the thumb drive cap 10 as audio is played.

The thumb drive cap 10, in at least one embodiment, further includes a power button 20. In yet another embodiment, the power button 20 further includes an LED indicator light 21 defined within the power button 20 and configured to illuminate when the thumb drive cap 10 is in an ON state and to not illuminate when the thumb drive cap 10 is in an OFF state.

The thumb drive cap 10, in at least one embodiment, also includes a Bluetooth interface 37. The Bluetooth interface 37 provides for the thumb drive cap 10 to use Bluetooth and to be paired with Bluetooth compatible devices.

The thumb drive cap 10, in at least one embodiment, further includes a visual display 15. The visual display 15 is configured to provide a user with visual information. The display information can include, for example, song title, artist, length, album title, file size, and so forth.

The thumb drive cap 10, in at least one embodiment, also includes a scroll mechanism 17. The scroll mechanism 19 can be utilized to scroll through items on the visual display 15, for example.

The thumb drive cap 10, in at least one embodiment, further includes: a VOLUME control 30; a PLAY button 24; a RECORD button 22; a NEXT TRACK button 28; and a PREVIOUS track button 26.

In another exemplary embodiment, the technology described herein provides a portable media player/recorder system. The portable media player/recorder system includes: at least one portable USB storage thumb drive 12; a portable housing 13*a*, 13*b* defined as a USB thumb drive cap 10 for the portable USB storage thumb drive 12; a female USB connector interface 14 defined within the portable housing 13*a*, 13*b* and configured to receive as a cap and electronically couple to a male USB connector on the portable USB storage thumb drive12; a control unit (FIG. 2) disposed within the portable housing 13*a*, 13*b* and configured to enable audio playback through the thumb drive cap 10 of audio data stored on the connected portable USB storage thumb drive 12; a plurality of user interface buttons 22, 24, 26, 28, 30 disposed upon the portable housing and through which the thumb drive cap 10 is controlled by a user for audio playback and audio record; and an audio output port 16.

In another exemplary embodiment, the technology described herein provides a method audio playback utilizing a thumb drive cap. The method includes any one or more of the following method steps, and in an order that can vary:

utilizing a thumb drive cap comprising: a portable housing defined as a USB cap for a portable USB storage thumb drive; a female USB connector interface defined within the portable housing and configured to receive and electronically couple to a male USB connector on the portable USB storage thumb drive; a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record;

enabling audio playback through the thumb drive cap of audio data stored on the connected portable USB storage thumb drive;

retrieving audio data stored on the connected portable USB storage thumb drive;

enabling audio record input through the thumb drive cap; and storing recorded data on the portable USB storage thumb drive;

accessing audio files stored on the portable USB storage thumb drive; and playing the accessed audio files through the thumb drive cap;

amplifying audio;

amplifying a signal;

actuating by voice the thumb drive cap; and receiving input audio signals.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A thumb drive cap comprising:

a portable housing defined as a USB cap for a portable USB storage thumb drive;

a female USB connector interface defined within the portable housing and configured to receive and electronically couple to a male USB connector on the portable USB storage thumb drive;

a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record.

2. The thumb drive cap of claim 1, wherein the control unit is further configured to enable audio record input through the thumb drive cap and stored on the portable USB storage thumb drive.

3. The thumb drive cap of claim 1, wherein the thumb drive cap is further configured not to store audio files in the thumb drive cap but to access audio files stored on the portable USB storage thumb drive for playback through the thumb drive cap.

4. The thumb drive cap of claim 1, wherein the control unit further comprises:

a microprocessor.

5. The thumb drive cap of claim 1, wherein the control unit further comprises:

an audio amplifier.

6. The thumb drive cap of claim 1, wherein the control unit further comprises:

a signal amplifier.

7. The thumb drive cap of claim 1, wherein the control unit further comprises:

a digital signal processor.

8. The thumb drive cap of claim 1, wherein the control unit further comprises:

a memory.

9. The thumb drive cap of claim 1, wherein the control unit further comprises:

a firmware logic.

10. The thumb drive cap of claim 1, further comprising:

a microphone disposed within the portable housing.

11. The thumb drive cap of claim 1, further comprising:

a microphone disposed within the portable housing and configured to activate the thumb drive cap by voice actuation.

12. The thumb drive cap of claim 1, further comprising:

a microphone disposed within the portable housing and configured to receive input audio signals to be processed by the control unit.

13. The thumb drive cap of claim 1, further comprising:

a microphone disposed within the portable housing and configured to receive input audio signals to be processed by the control unit and stored on the attached portable USB storage thumb drive.

14. The thumb drive cap of claim 1, further comprising:

a power source disposed within the portable housing.

15. The thumb drive cap of claim 1, further comprising:

an audio output port.

16. The thumb drive cap of claim 1, further comprising:

a speaker.

17. The thumb drive cap of claim 1, further comprising:

a power button; and an LED indicator light defined within the power button and configured to illuminate when the drive cap is in an ON state and to not illuminate when the drive cap is in an OFF state.

18. The thumb drive cap of claim 1, further comprising:

a Bluetooth interface.

19. The thumb drive cap of claim 1, further comprising:

a visual display.

20. The thumb drive cap of claim 1, further comprising:

a scroll mechanism.

21. The thumb drive cap of claim 1, wherein the plurality of user interface buttons further comprises:

a VOLUME control;

a PLAY button;

a RECORD button;

a NEXT TRACK button; and a PREVIOUS track button.

22. A portable media player/recorder system comprising:

at least one portable USB storage thumb drive;

a portable housing defined as a USB thumb drive cap for the portable USB storage thumb drive;

a female USB connector interface defined within the portable housing and configured to receive as a cap and electronically couple to a male USB connector on the portable USB storage thumb drive;

a control unit disposed within the portable housing and configured to enable audio playback through the thumb drive cap of audio data stored on the connected portable USB storage thumb drive;

a plurality of user interface buttons disposed upon the portable housing and through which the thumb drive cap is controlled by a user for audio playback and audio record; and an audio output port.

23. The portable media player/recorder system of claim 22, wherein the control unit is further configured to enable audio record input through the thumb drive cap and stored on the portable USB storage thumb drive.

24. The portable media player/recorder system of claim 22, wherein the thumb drive cap is further configured not to store audio files in the thumb drive cap but to access audio files stored on the portable USB storage thumb drive for playback through the thumb drive cap.

25. The portable media player/recorder system of claim 22, wherein the control unit further comprises:

a microprocessor.

26. The portable media player/recorder system of claim 22, wherein the control unit further comprises:

an audio amplifier.

27. The portable media player/recorder system of claim 22, further comprising:

a signal amplifier.

28. The portable media player/recorder system of claim 22, wherein the control unit further comprises:

a digital signal processor.

29. The portable media player/recorder system of claim 22, wherein the control unit further comprises:

a memory.

30. The portable media player/recorder system of claim 22, wherein the control unit further comprises:

a firmware logic.

31. The portable media player/recorder system of claim 22, further comprising:

a microphone disposed within the portable housing.

32. The portable media player/recorder system of claim 22, further comprising:

a microphone disposed within the portable housing and configured to activate the thumb drive cap by voice actuation.

33. The portable media player/recorder system of claim 22, further comprising:

a microphone disposed within the portable housing and configured to receive input audio signals to be processed by the control unit.

34. The portable media player/recorder system of claim 22, further comprising:

a microphone disposed within the portable housing and configured to receive input audio signals to be processed by the control unit and stored on the attached portable USB storage thumb drive.

35. The portable media player/recorder system of claim 22, further comprising:

a power source;

a power button; and an LED indicator light defined within the power button and configured to illuminate when the drive cap is in an ON state and to not illuminate when the drive cap is in an OFF state.

36. The portable media player/recorder system of claim 22, further comprising:

a speaker.

37. The portable media player/recorder system of claim 22, further comprising:

a Bluetooth interface.

38. The portable media player/recorder system of claim 22, further comprising:

a visual display.

39. The portable media player/recorder system of claim 22, further comprising:

a scroll mechanism.

40. The portable media player/recorder system of claim 22, wherein the plurality of user interface buttons further comprises:

a VOLUME control;

a PLAY button;

a RECORD button;
a NEXT TRACK button; and
a PREVIOUS track button.

41. A method audio playback utilizing a thumb drive cap, the method comprising:

utilizing a thumb drive cap comprising: a portable housing defined as a USB cap for a portable USB storage thumb drive; a female USB connector interface defined within the portable housing and configured to receive and electronically couple to a male USB connector on the portable USB storage thumb drive; a control unit disposed within the portable housing and configured to enable audio playback through the thumb drive cap of audio data stored on the connected portable USB storage thumb drive; and a plurality of user interface buttons disposed upon the portable housing and through which the thumb drive cap is controlled by a user for audio playback and audio record;

enabling audio playback through the thumb drive cap of audio data stored on the connected portable USB storage thumb drive; and retrieving audio data stored on the connected portable USB storage thumb drive.

42. The method of claim 41, wherein the control unit is further configured to enable audio record input through the thumb drive cap and stored on the portable USB storage thumb drive, the method further comprising:

enabling audio record input through the thumb drive cap; and storing recorded data on the portable USB storage thumb drive.

43. The method of claim 41, wherein the thumb drive cap is further configured not to store audio files in the thumb drive cap but to access audio files stored on the portable USB storage thumb drive for playback through the thumb drive cap, the method further comprising:

accessing audio files stored on the portable USB storage thumb drive; and playing the accessed audio files through the thumb drive cap.

44. The method of claim 41, wherein the control unit further comprises a microprocessor.

45. The method of claim 41, wherein the control unit further comprises an audio amplifier, the method further comprising:

amplifying an audio input.

46. The method of claim 41, wherein the control unit further comprises a signal amplifier, the method further comprising:

amplifying a signal.

47. The method of claim 41, wherein the control unit further comprises a digital signal processor.

48. The method of claim 41, wherein the control unit further comprises a memory.

49. The method of claim 41, wherein the control unit further comprises a firmware logic.

50. The method of claim 41, wherein the thumb drive cap further comprises a microphone disposed within the portable housing.

51. The method of claim 41, wherein the thumb drive cap further comprises a microphone disposed within the portable housing and configured to activate the thumb drive cap by voice actuation, the method further comprising:

actuating by voice the thumb drive cap.

52. The method of claim 41, wherein the thumb drive cap further comprises a microphone disposed within the portable housing and configured to receive input audio signals to be processed by the control unit, the method further comprising:

receiving input audio signals.

53. The method of claim 41, wherein the thumb drive cap further comprises a microphone disposed within the portable housing and configured to receive input audio signals to be processed by the control unit and stored on the attached portable USB storage thumb drive, the method further comprising:

receiving input audio signals.

54. The method of claim 41, wherein the thumb drive cap further comprises a power source disposed within the portable housing.

55. The method of claim 41, wherein the thumb drive cap further comprises an audio output port.

56. The method of claim 41, wherein the thumb drive cap further comprises a speaker.

57. The method of claim 41, wherein the thumb drive cap further comprises: a power button; and an LED indicator light defined within the power button and configured to illuminate when the drive cap is in an ON state and to not illuminate when the drive cap is in an OFF state.

58. The method of claim 41, wherein the thumb drive cap further comprises a Bluetooth interface.

59. The method of claim 41, wherein the thumb drive cap further comprises a visual display.

60. The method of claim 41, wherein the thumb drive cap further comprises a scroll mechanism.

61. The method of claim 41, wherein the plurality of user interface buttons of the thumb cap drive further comprises: a VOLUME control; a PLAY button; a RECORD button; a NEXT TRACK button; and a PREVIOUS track button.

* * * * *